(No Model.) 4 Sheets—Sheet 1.
A. GIPPERICH.
APPARATUS FOR DETERMINING ELECTRIC OR MAGNETIC FORCES.
No. 400,661. Patented Apr. 2, 1889.
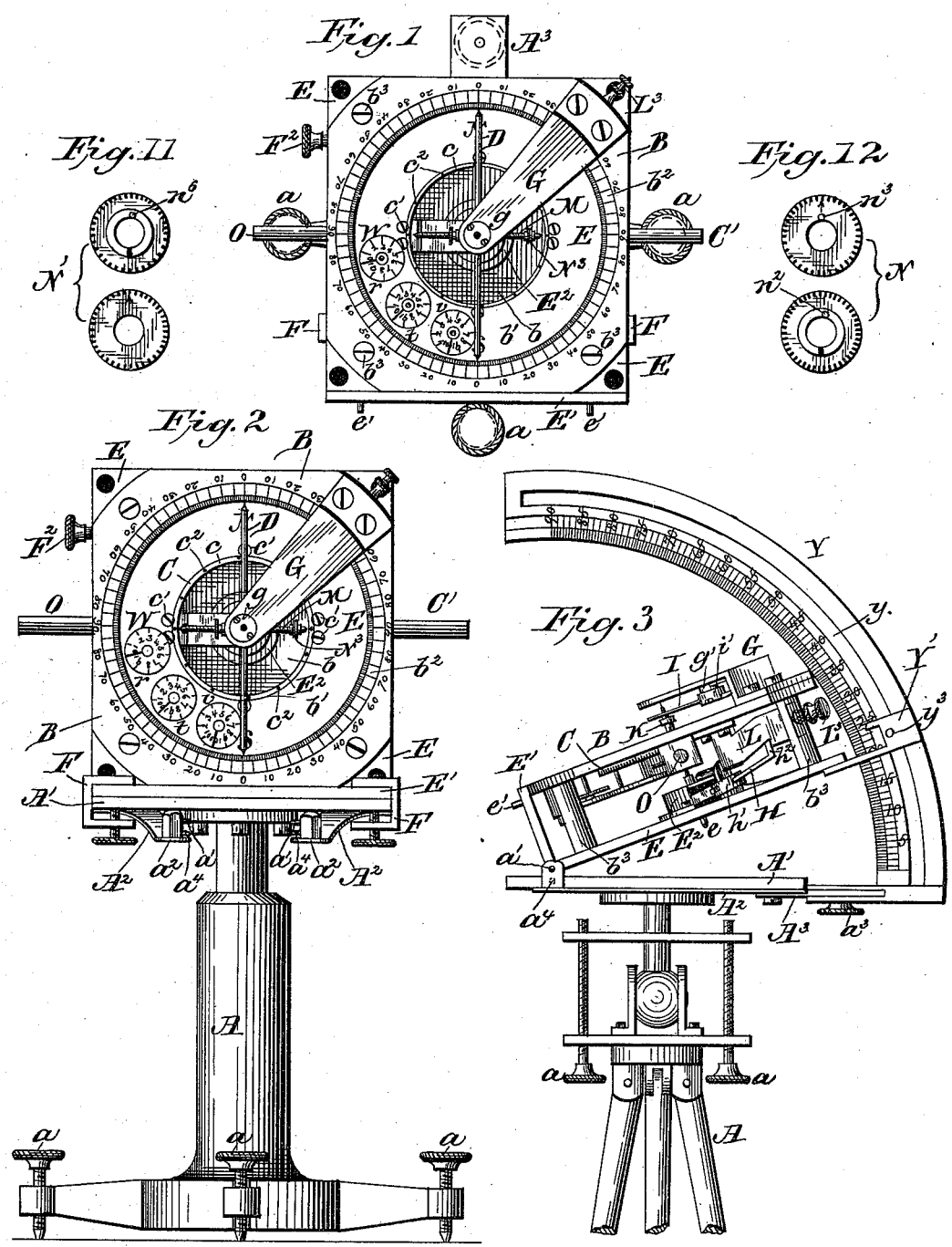

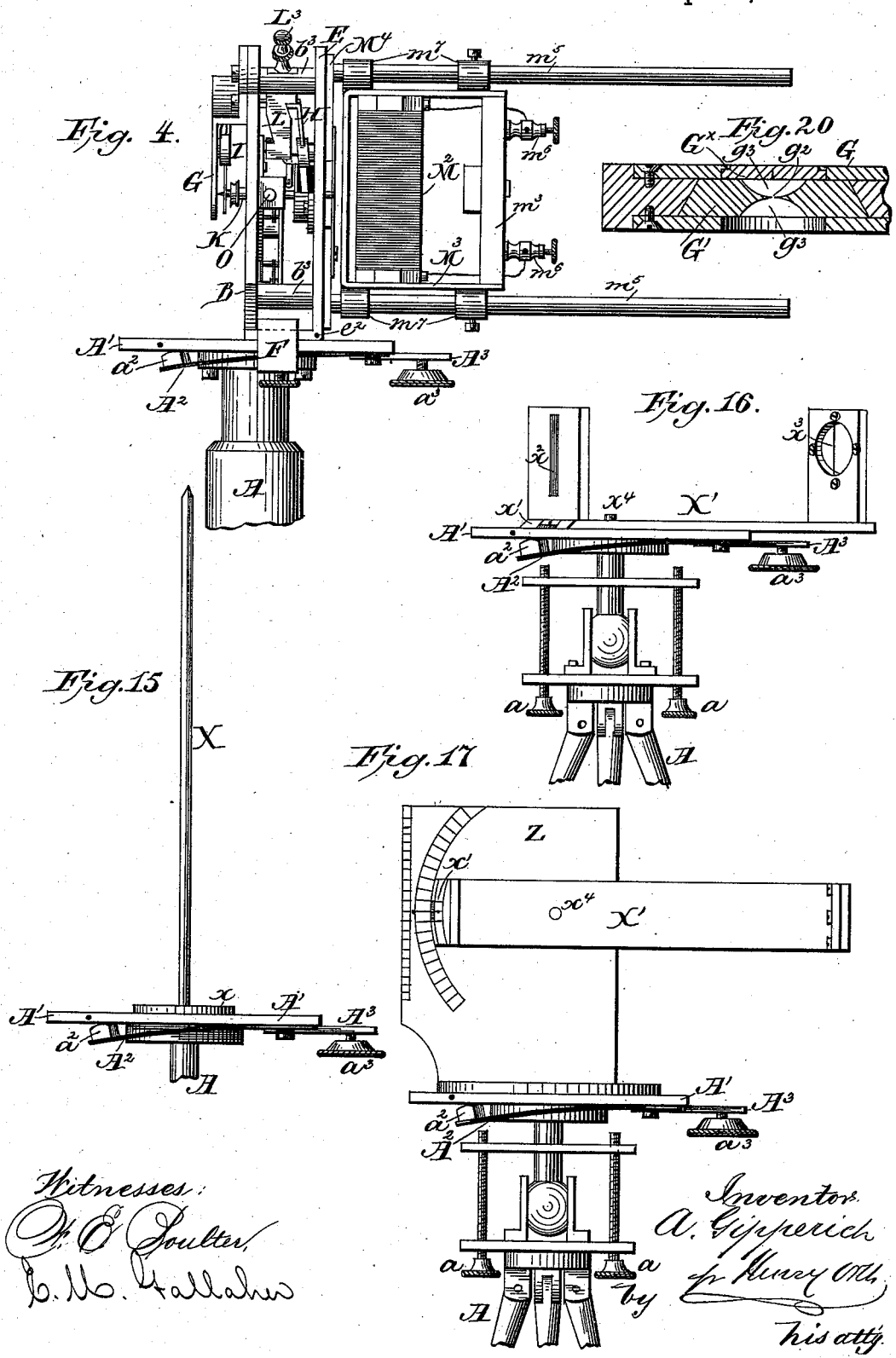

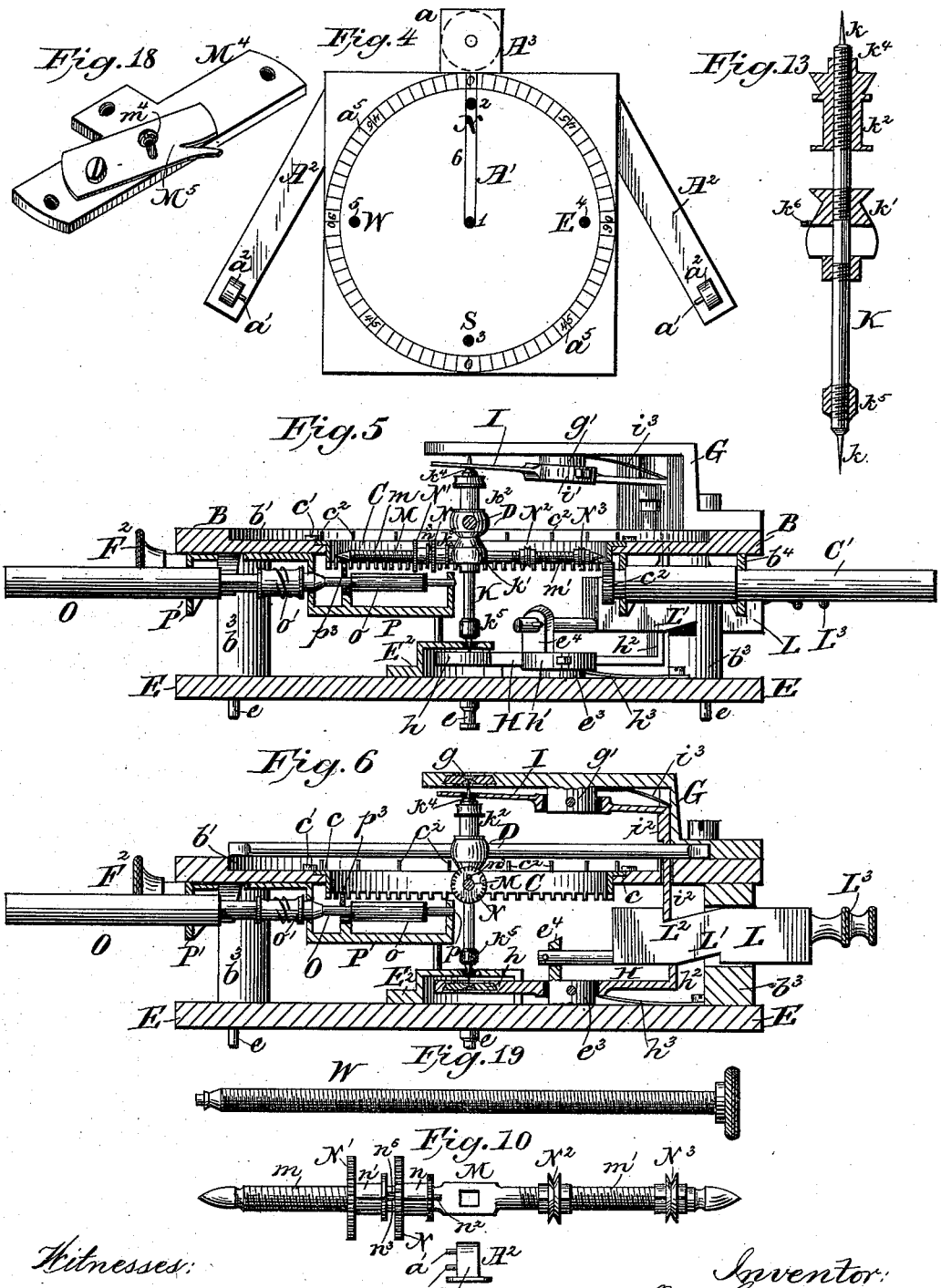

(No Model.) 4 Sheets—Sheet 4.
A. GIPPERICH.
APPARATUS FOR DETERMINING ELECTRIC OR MAGNETIC FORCES.
No. 400,661. Patented Apr. 2, 1889.
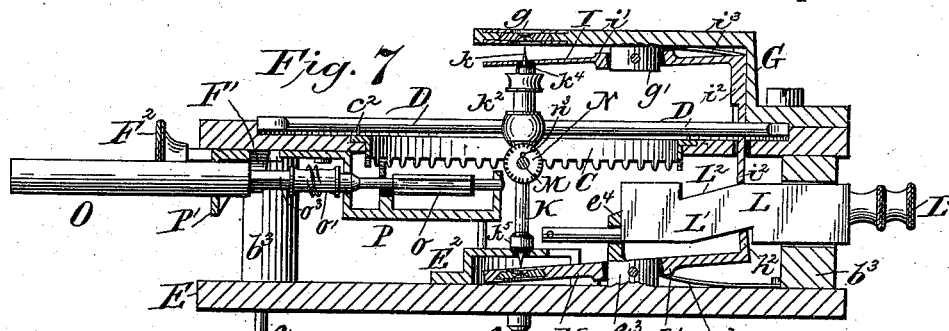
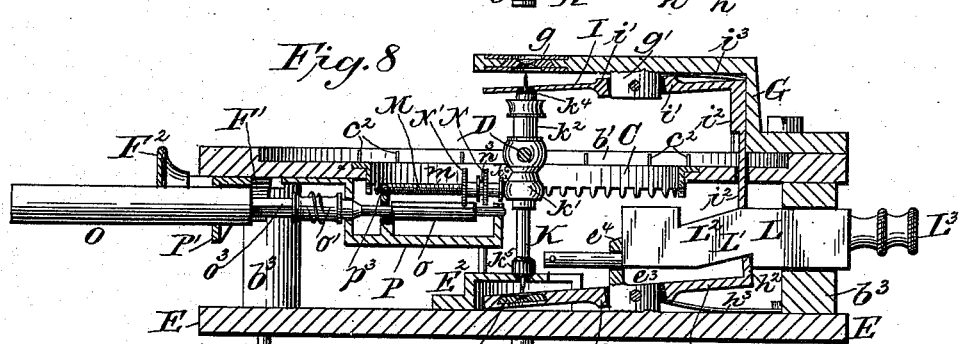
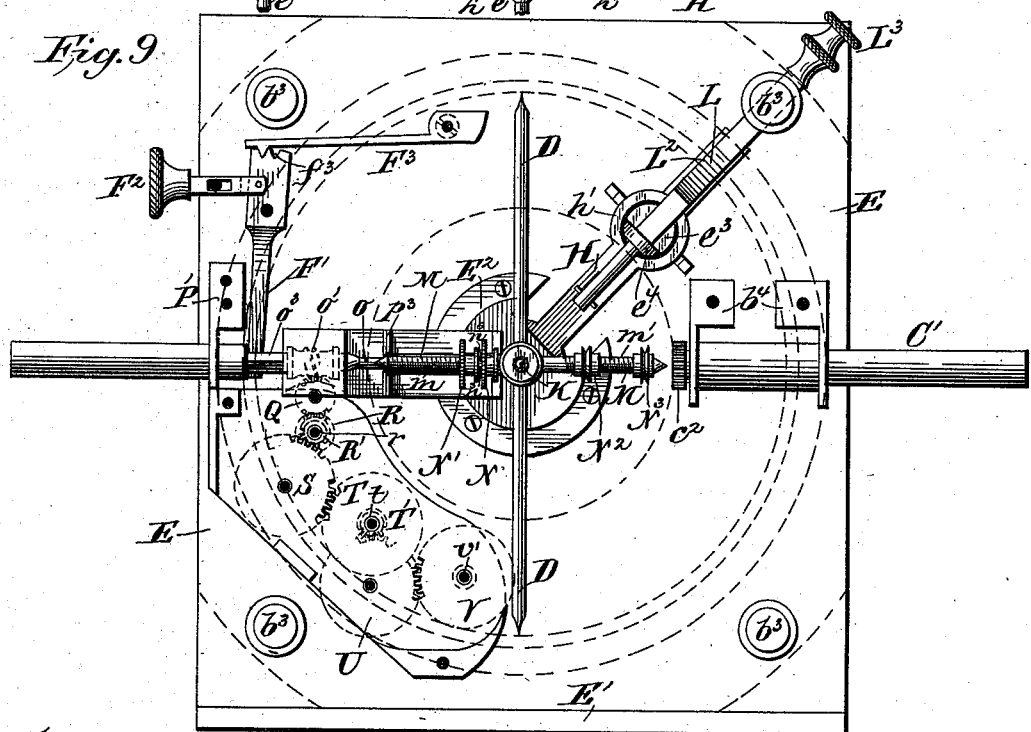

UNITED STATES PATENT OFFICE.

ADOLPHUS GIPPERICH, OF RICHMOND, VIRGINIA.

APPARATUS FOR DETERMINING ELECTRIC OR MAGNETIC FORCES.

SPECIFICATION forming part of Letters Patent No. 400,661, dated April 2, 1889.

Application filed January 24, 1888. Serial No. 261,731. (No model.)

*To all whom it may concern:*

Be it known that I, ADOLPHUS GIPPERICH, a citizen of the United States, residing at Richmond, in the county of Henrico and State of Virginia, have invented certain new and useful Improvements in the Art of Determining the Value of Electric, Magnetic, or Electro-Magnetic Forces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Referring to the drawings, Figure 1 is a top plan view, Fig. 2 a front elevation, and Figs. 3 and 4 side elevations, showing the instrument in its different positions. Fig. 4$^a$ is a top plan view of the top plate or table of the support for the instrument. Figs. 5 and 6 are sections drawn to an enlarged scale, and taken, respectively, on the east and west meridian line and on said line to the axis of the needle and balance staff, and thence to the northeast corner of the instrument, the needle and balance staff being free to revolve in its bearings. Figs. 7 and 8 are views similar to Fig. 6, showing the needle and balance staff out of its bearings, the balance in Fig. 8 being shown as locked against movement. Fig. 9 is a top plan view of the apparatus, the upper plate thereof being re-moved to better show the train of registering-gearing. Fig. 10 is a detached view on an enlarged scale of the balance. Figs. 11 and 12 show each opposite end views of the two weights of the balance. Fig. 13 is a sectional elevation of the needle and balance staff detached. Fig. 14 is an end view of one of the arms pivoted to the table or top plate of the support for the instrument. Figs. 15, 16, and 17 are elevations illustrating the various devices used in conjunction with the instrument. Fig. 18 is an isometric view of the plate employed for connecting the wire spools with the instrument in weighing electric currents. Fig. 19 is an elevation of the vibrator; and Fig. 20 is a sectional view on an enlarged scale, showing the construction of the jeweled bearings for the needle and balance staff.

The invention relates to the art of determining the value of magnetic or electric or electro-magnetic forces by weight, and has for its object means for weighing such forces and for neutralizing the body upon which such forces act, so as to leave such body free to be acted upon by other like forces.

In carrying out my invention any suitable body capable of being influenced by magnetism or analogous forces and capable of responding freely to such influences may be employed. I have found that a polarized body, such as a magnetic needle, answers the purposes in view.

The invention consists in means for determining magnetic or electric or electro-magnetic forces by weight, and to the mode of and means for neutralizing the effect of such forces or currents upon a body influenced thereby, so as to leave said body free to the influence of like forces from a different source, substantially as hereinafter fully described, and as set forth in the claims.

The invention further consists in a polarized body mounted on a staff or arbor, in the combination therewith of a scale or balance for weighing the deflections or dip of the body under the influence of varying magnetic forces or for weighing electrical or electro-magnetic forces, and in means for registering the weight of such forces, substantially as hereinafter fully described, and as set forth in the claims.

The invention further consists in means for mechanically adjusting the weights on the scale or balance, in weighing the forces referred to, and in means for holding the staff or arbor of the polarized body out of its bearings when the instrument is not in use or for other purposes, substantially as hereinafter described, and as set forth in the claims.

The invention further consists in means for setting or adjusting the polarized body on the balance-staff to any desired position relatively to the scale or balance, substantially as hereinafter described, and as set forth in the claims.

The invention consists, finally, in the construction of the bearings for the staff or arbor of the magnetic needle, in the construction of the balance, and other details of construction and combinations of parts, substantially as hereinafter described, and as set forth in the claims.

The principle upon which the operation of my instrument is based is that of the ordinary scales or that of the gravity of a weight combined with a poised or equilibrated polarized body—such as a magnetic needle—the relation between said weight and polarized body being such that both may swing in any desired plane either horizontally or vertically, in the plane of the magnetic meridian north and south, or at right angles to said meridian east and west, or at any desired angle to the plane of such meridians, or in a plane perpendicular to the angle of inclination or dip, and, further, that the relative position of said polarized body and weight or balance on their common staff may be varied at will between parallelism and a right angle.

In the description of the instrument I shall refer to the polarized body as the "magnetic needle," for such, in fact, it is, though other forms and arrangements of polarized bodies may be employed.

The support for the instrument may be stationary or portable according to the uses made of the instrument, and consists in the former case of a suitable stand and in the latter case of a tripod—such as is used by surveyors.

The stand A, Fig. 2, is provided with leveling-screws $a$ and a plate or table, A', secured to said stand. The plate A', I have shown of rectangular form to correspond with that of the frame-plates of the instrument and of substantially the same dimensions.

To the under side of the plate A' are pivoted two arms, $A^2$, Figs. 2, 3, 4, 4$^a$, and 14, that are provided at their outer free ends with bearing-blocks $a^2$, from which project bearing pins or journals $a'$ and locking pins or studs $a^4$. The journals $a'$ serve to support the instrument at any desired angle, as described hereinafter, while the pins or studs $a^4$ enter sockets or bearings in the opposite sides of the plate A' to firmly support the arms, as shown in Fig. 3. When the arms are not in use, they are pushed below the plate A', as shown in Fig. 2, said arms being made sufficiently elastic for the purpose.

The plate A', Fig. 4$^a$, is divided by two median lines into four equal parts indicating the four cardinal points. On the north and south median line the plate has three holes or sockets—namely, a hole, 1, in the center and two holes, 2 and 3, on opposite sides and equidistant from said center. On the east and west median line the plate is also provided with two holes or sockets, 4 and 5, on opposite sides of the center or axial hole, 1, and on opposite sides of the north and south median line are traced two lines, 6, for purposes described hereinafter. On the under side of the plate A' is further secured a plate or bracket, $A^3$, Figs. 1, 3, 4, 4$^a$, 15, 16, and 17, in which works a screw, $a^3$, for purposes described hereinafter. Finally, the said plate A' is also provided on its face with a circle, $a^5$, Fig. 4$^a$, divided into three hundred and sixty degrees, corresponding with a like circle on the dial-plate of the instrument, said plate in portable instruments constituting the top plate or table of a tripod, as shown in Figs. 3, 4, 16, and 17, on which tripod said table is revoluble, and is combined with the usual means for adjusting and leveling the same. Such means being well known, and being substantially the same as those used in surveying-instruments, need therefore not be described in detail.

When the instrument is not used as a portable instrument, the graduated circle $a^5$ on plate A' may be dispensed with.

In practice the instrument will be inclosed in a case or box provided with a glass face, which I have also deemed unnecessary to show, such arrangements being well known, the devices for manipulating the mechanism projecting through said box to avoid its being unnecessarily opened.

The instrument itself is constructed as follows:

B indicates the front or dial plate. It is square and of the same size as the supporting-plate A', and is shown with its corners cut away or rounded off. Said plate may, however, be made in the form of a disk, if desired, and need not necessarily be of the same size as the supporting-plate A'. The dial-plate B has a central opening, $b$, in which is secured a crown-wheel, C, said crown-wheel being provided with a flange, $c$, that rests on the upper edge of the circular opening $b$, and is secured so as to revolve freely by means of screws $c'$. Any other suitable means may be adopted to adapt the crown-wheel to revolve on its bearings, and so that its teeth will project from the under side of the dial-plate.

From the upper face of the flange of the crown-wheel project a number of pins, $c^2$, arranged equidistant from one another, said pins serving the purpose of rotating the magnetic needle D on its arbor or staff independently of said arbor for the purpose of adjusting said needle in the plane of rotation of its staff to any desired angle relatively to the scale or balance, as explained hereinafter.

The central opening, $b$, of dial-plate B is formed in a circular recessed portion, $b'$. Around this circular depression $b'$ is traced a circle, $b^2$, divided into three hundred and sixty degrees and fractions, which in portable instruments corresponds exactly with a like circle on the supporting-table A', as mentioned hereinbefore. The dial-plate B is supported on pillars $b^3$, secured to a back plate, E, at the four corners thereof, said back plate being provided with a foot-plate, E', at right angles thereto, for supporting the instrument in a vertical position on the table A' either on a line north and south or east and west; and to this end said foot-plate E' has pins $e'$ $e'$, Figs. 1 and 3, projecting therefrom that fit into the holes 2 3 and 4 5 on the north and south and east and west lines, respectively, of said table A'. From the rear or under face of the back plate, E, also project three pins, e e e, that fit into the holes 1, 4, and 5 on the east and west line as well as in the holes 1, 2, and 3 on the north and south line of the table A' for supporting the instrument either in a plane at right angles to the terrestrial or to a local magnetic meridian or in the plane of such meridian.

To avoid the accidental dislodgment of the instrument, especially when carried about in the use thereof for prospecting, I employ detachable clamps F, Figs. 1, 2, and 4, that serve to clamp the instrument firmly to the table A' in any of the positions indicated above.

At the southeast and southwest corners, respectively, the back plate, E, or the foot-plate E' has journal-bearings $e^2$, Fig. 4, for the journals $a'$ on the pivoted arms $A^3$ of the table A', referred to hereinbefore. From the northeast corner of the dial-plate B projects a cock, G, in the outer end of which is secured the bearing $g$ for the upper end of the needle and balance staff or arbor. The bearing $h$ for the lower end of said staff is formed in one end of a pivoted lever, H, that extends under a bridge, $E^2$, secured to the back plate, E, said bridge being of such a height as to allow the necessary vertical motion to the end of lever H, for purposes presently explained. The bearings $g$ and $h$ in cock G and lever H, when said lever is in position to support the lower or inner end of the staff, are in a plane at right angles to and forming the axis of the north and south and east and west lines, respectively, so that the staff itself is the axis of the system.

It is essential that the magnetic needle in an instrument of this class should be suspended or otherwise mounted or poised as delicately as possible, in order to annul, as far as this can be done, the frictional resistance to its oscillation or vibration. In ordinary compasses the needle has a hollow-cone bearing and is suspended from a cone-journal. In the construction of this particular instrument this mode of suspending the needle is, however, not available, since the needle is mounted on a staff that also carries a balance, two bearings being therefore necessary. To reduce the friction to a minimum, I provide jeweled bearings $g$ and $h$, of peculiar construction, referring more particularly to Fig. 20. The jewels G' have a hole; $g^2$, said hole being enlarged at opposite ends, so as to form substantially semi-spherical cavities $g^3$, the intervening wall of which tapers to a knife-edge around the hole or bearing proper, $g^2$, as shown, the staff K having cone-journals $k$, Fig. 13, that enter said bearings $g$ and $h$. $G^×$ is the abutting jewel against which the cone-journal of the staff abuts.

The staff K, Figs. 5, 6, 7, 8, and 13, is constructed of a slender rod of steel that carries at its longitudinal center a boss or enlargement of brass, $k'$, to which the balance is secured. Above said boss is arranged a flanged sleeve, $k^2$, between which and the boss is secured the magnetic needle D, which latter is held in frictional contact on the staff between said boss and sleeve. The upper end of the sleeve $k^3$ forms a bearing or shoulder, $k^4$, for the outer or free end of a spring-actuated lever, I, the end and cone-journal of the staff passing freely through said lever. The lever I serves as a guide to the staff K to guide it from and to its bearing $g$ in cock G, and the lever H serves to support the lower end of said staff, and has sufficient motion to disengage the lower cone-journal, $k$, from the bearing $h$ in said lever, so that the staff may, when desired or necessary, be completely disengaged from its bearings.

The bearing-holes $g^2$, as well as the cone-journals $k$, in an operative instrument of this character are as delicate and small or slender as those in the finest watch, and even more so, in order to enable the staff to revolve freely under the slightest magnetic influence on the needle. It is therefore necessary that the movements of the staff and the levers I H should be as near as possible absolutely true, in order to bring said staff to its bearings when moved away from them. This can only be secured by avoiding both longitudinal and lateral motion of the levers G and H, and to this end said levers are fulcrumed in a manner similar to that adopted in the suspension of chronometers.

The lever I is fulcrumed on a boss, $g'$, on the under side of the cock G and the lever H on a like boss, $e^3$, projecting from the back plate, E, each lever being provided with a ring, $i'$, and $h'$, respectively, from which the lever-arms project. At their rear ends the levers H and I are bent at right angles, or have right-angular arms, $h^2$ $i^2$, respectively, projecting toward each other and bearing on or abutting against two parallel inclined faces, L' $L^2$, respectively, of a push-bar, L. The push-bar L is guided in its movements by the pillar at the northeast corner of the instrument, through which pillar said bar passes, and by a guide, $e^4$, projecting from the boss $e^3$ on the back plate, E, to which the lever H is fulcrumed, said push-bar moving in the plane of the levers H and I. The end of the push-bar L that projects beyond the pillar carries a button, $L^3$, as a means for manipulating said bar.

$h^3$ and $i^3$ indicate the springs for the levers H and I, respectively.

The inclined faces L' $L^2$ on the push-bar L are so arranged that when said bar is pushed in the rear end of lever I will be first lifted to depress the outer or free end thereof until said outer end bears upon the outer end of the sleeve $k^2$ on the upper end of the staff K. Then the rear end of lever H is lifted by its spring $h^3$ to depress its forward end, and both lever ends will move downward until the conical end of a collar or sleeve, $k^5$, near the lower journal of the staff K, bears upon the bridge E² on the back plate, E, or seats in a corresponding seat formed in said bridge. The free or bearing end of lever H will then complete its downward movement until disengaged from the arbor or staff K. The staff K is now held out of its bearings and against rotation by the bridge E² and the lever I. By these means the needle D may be held against vibration in its bearings when not in use. When the staff is free to oscillate or rotate in its bearings, the needle D swings clear of the pins $c^2$, (projecting from the crown-wheel C, described hereinbefore;) but when the staff is lowered to move it out of its bearings said needle will lie in the path of the pins $c^2$, and may then be rotated by means of the rod C', carrying a pinion, C², which meshes with the teeth of the crown-wheel C, said rod being revoluble in bearings $b^4$, Fig. 9, depending from or secured to the under side of the dial-plate B.

The scale or balance M consists of a brass rod of about one and one-quarter inch in length turned true from two end centers into two slender limbs of equal length and thickness, leaving the central portion thick enough to cut a hole through it for the staff or arbor K, on which the said balance is held against rotation, and on which it must be as perfectly poised as the beam of a pair of scales on its knife-edges. A screw-thread is cut upon both limbs $m$ and $m'$ of the balance to the number of two hundred and thirty-six threads to the inch. The limb $m$ carries the adjustable weights and the limb $m'$ the counterpoises, that counterbalance the weights when at zero, or in their position nearest to the axis of rotation of the balance. The weights consist of two wheels, N and N', about two-tenths of an inch in diameter and provided with a split sleeve, $n$ and $n'$, respectively, to form a bearing of about one-sixteenth of an inch long, in which is cut a screw-thread corresponding with that on the limb $m$. The periphery of each weight is divided into fifty equal parts having twenty-five teeth and a corresponding number of intervening spaces. The weight N is first screwed upon the limb to the zero-mark, or to a position as close to the axis of rotation of the balance as possible, and is then counterbalanced by a counter-weight, N², consisting of a small body of brass screwed upon the limb $m'$ of the balance. The second wheel, N', is next screwed upon limb $m$ up to wheel N, and the second counterweight, N³, is adjusted to counterbalance the second weight. The weight of N and N' is so adjusted that each complete revolution thereof on the limb $m$ will be equal to one milligram suspended from the opposite limb of the balance at a point one-seventh of an inch from its axis of rotation and constitutes the point of leverage of the balance. Consequently the revolution of either weight for a distance of one tooth or point will be equivalent to one-twenty-fifth of a milligram at said point of suspension or leverage, and this constitutes the unit of the balance automatically indicated by a register in units, tens, and hundreds, plus or minus, according to the direction of rotation of the weights toward or from their zero-marks. The split sleeve of the weights holds them sufficiently tight on the limb $m$ of the balance to prevent accidental rotation or displacement from any cause other than the forcible or positive displacement or rotation thereof by mechanical means manipulated from the outside of the instrument. A single weight may be employed; but I prefer to employ two such weights for the purpose of doubling the capacity of the balance, and for which purpose I have provided means for moving the weight N' alone or both weights N' N simultaneously. In the latter case the indications on the register-dials must be multiplied by two, since the weight displaced is doubled. The capacity of the balance is three thousand six hundred units or one hundred and forty-four milligrams, suspended from limb $m'$ at the point above referred to. The magnetic needle D is preferably cylindrical and is two inches in length. It is perfectly balanced on the staff before it is magnetized, and is seated thereon, as above described, above the balance M, so as to just clear the weights N and N'.

In order to facilitate the setting of the weights N and N' to their zero-mark, I mark that tooth which stands vertically above the limb $m$, when either weight has reached its zero-mark, by any suitable indication—such as an arrow, Figs. 11 and 12, or any other suitable index.

To prevent the weights from jamming when brought to their zero-mark, the lateral or outer face of the bearing $k'$ on staff K is provided with a pin, $k^6$, Fig. 13. A like pin, $n^2$, is secured to the outer end of the sleeve of the weight N, so that when said weight reaches the zero-mark the index will lie vertically above the limb and the pin $n^2$ in contact with the pin $k^6$ on bearing $k'$, thus preventing the weight N from jamming against the face of the bearing $k'$ and at the same time indicating that said wheel stands at zero. A like arrangement is adopted for the weight N', whose sleeve carries a pin, $n^8$, that engages a pin, $n^3$, on the outer face of the weight N, as shown in Fig. 12. As the weights cannot be mechanically moved on the balance in either direction, except by locking the balance rigidly into position, and as this cannot be done except by lowering the staff K, and thereby disengaging it from its bearings, neither the bearings nor the teeth on the wheels or their operating-pinions can be injured should the operating-pinion be rotated after the stop-pins come in contact to stop the further rotation of the weights N and N', for the reason that the staff is held out of its bearings, and is so held by a yielding or spring pressure at its upper end, as hereinabove set forth. Care should be had to cease manipulating the operating-pinion o when the weights N and N′ have reached zero. Yet should the pinion, by inadvertence, be further rotated, the power applied thereto will lift the staff K, the leaf of the pinion in contact with a tooth of the weight will pass over said tooth, and as soon as this has taken place the spring-lever I forces the staff back again to its bearing in the bridge $E^2$, thereby producing an audible sound or click that will indicate to the operator that he has revolved the pinion after the stoppage of the weights. At the same time the register-hands will be carried one point beyond the zero-graduation, giving a visible indication that the operating-pinion has been revolved too much. Inasmuch as the register can be freely manipulated when the needle and balance staff is brought to its bearings, the hands of the register may therefore be returned to their zero-mark by simply returning the staff to its bearings, so as to disengage the weight or weights from the pinion. This is of importance in an instrument of this class, in which the stops referred to are necessarily very small and the resistance offered by their contact comparatively slight.

The mechanism for manipulating the weights on the balance and for registering the weight of a magnetic, electric, or magneto-electric force, either plus or minus, consists, as more plainly shown in Figs. 5 to 9, of a pinion, o, that has three leaves and is of a length nearly equal to the screw-threaded portion of the weight-limb m of the balance M. The pinion o constitutes the inner end of an arbor, O, that is revoluble in bearings formed in the opposite ends of a bracket, P, supported from the front plate and from the bridge $E^2$, respectively, and in a second bracket, P′, also secured to the front plate, B.

Between the bearing-brackets P and P′ the arbor O has a worm-thread, o′, that operates the register-gearing, Fig. 9. Said worm o′ meshes with a transmitting-pinion, Q, having ten teeth, that meshes with a like pinion, R, whose arbor carries at its upper end a pinion, R′, which has eight teeth. This pinion R′ meshes with a wheel, S, of eighty teeth, and said wheel S meshes with a like wheel, T, whose arbor carries a pinion, T′, of eight teeth, that meshes with a wheel, U, of eighty teeth, and the latter wheel meshes with a like wheel, V, on arbor v′. The arbors for the pinion R and wheels T V carry, respectively, the units, tens, and hundreds hands, that travel, respectively, over the dials r t v, Figs. 1 and 2. By the described arrangement of gearing all the hands are caused to travel in the same direction, which facilitates the reading, since the hands may be moved in either direction in the operation of recording the plus or minus weight of forces.

I have stated above that either the weight N′ or both weights N and N′ may be revolved by the pinion o. To this end I employ means for shifting the pinion endwise in its bearings, the toothed portion or pinion o of the arbor O not meshing with weight N when both weights are at the zero-mark, but will mesh when said arbor is shifted in a direction from west to east. To this end the arbor O has a squared portion, $o^3$, on which bears a flat shifting spring-lever, F′, fulcrumed to the under side of the dial-plate B. The short arm of the spring-lever is pivoted to the end of a push-bar, $F^2$, and in the rear edge of said short arm of the lever F′ are formed two stop-notches, $f^3 f^3$, with which engages a tooth on a locking-spring, $F^3$, also secured to the under side of the dial-plate B, to limit the throw of the lever and lock the same and the arbor O against endwise movement. The balance M and its staff K are locked against rotation by bringing the balance on the line east and west of the instrument with weight-limb m on the west side, and on lowering the staff K, as hereinbefore described, said limb will be guided into a notch, $p^3$, whose sides incline outwardly, formed in the upper face of the outer bearing of bracket P for the arbor O. Finally, I would state that, no matter how the bearings for the staff K are constructed, there is necessarily some friction, and this is detrimental to true results in the observations with this or similar instruments. I have found that this friction may be nullified by imparting a rapid but gentle vibratory motion to the staff. I impart this vibration to the staff by means of a rod, W, Fig. 19, about one-tenth of an inch in diameter, which has its surface uniformly roughened by forming a fine screw-thread thereon, the instrument being provided with a pin having a milled head projecting from the case or box or secured to the back or dial plate, or the milled head of lever L or of push-bar $F^2$ may be used for this purpose, on which milled head the vibrator W is laid and gently drawn to and fro. A rapid vibration or tremulous motion is thus imparted to the instrument, and consequently to the staff K, that will be sufficient to overcome the frictional resistance between the bearings of said staff, as experience has fully demonstrated, thereby allowing the needle D to swing into its true angle of attraction without impediment.

I would also state that in the description of an instrument of this character it is necessary, in order to make its construction and operation plain, to give measurements and weights. It will, however, be understood that I do not limit myself to those given, as they may be varied according to the capacity the instrument is to have.

Before describing the uses and operation of the instrument I would state that accurate results cannot be obtained with an instrument of the class under consideration unless the forces to be weighed are acting upon a perfectly equilibrated polarized body or balance, and unless such body or balance is neutralized as against the force of terrestrial magnetism. It is therefore necessary to determine the exact point of leverage of the balance—namely, that point from which is suspended the counterpoise for the shifting weight when placed at the zero-mark. The point of leverage in such a balance can, however, not be ascertained, for reasons presently explained, without first ascertaining the center of attraction of the polarized body, whether such body constitutes the balance itself or whether a balance-lever is connected therewith, as in the instrument under consideration, and in all instruments of this class these factors—namely, perfect leverage of the balance and neutralization against the force of terrestrial magnetism—have heretofore never been taken into consideration, for the reason that no means were known by which the center of attraction—hence the point of leverage of a polarized body—could be ascertained.

I would state here that, although it is necessary to briefly describe the mode of ascertaining the point of leverage in order to obtain accuracy in the operation of weighing, I do not desire to claim the same in this application. I have hereinabove stated that this point of leverage of the balance M is distant one-seventh of an inch from its axis of rotation, as it will then be proportionate to the leverage or center of attraction of the magnetic needle.

It is a well-known fact that the force of a polarized body is not exerted at the ends thereof only. This may be demonstrated by embedding the body in iron filings. On withdrawing the same it will be found that the iron filings arrange themselves in a body that has its greatest thickness at the extreme end of the polarized body, while no filings will adhere to the central portion thereof. This fact led me to the discovery of a means for ascertaining the center of attraction of polarized bodies, which varies according to their dimension and power and has to be determined for each of such bodies. This I accomplish as follows, taking the needle D as an example:

When the needle is counterpoised or neutralized against the vertical force of terrestrial magnetism, as described hereinafter, I provide a suitable support on which the needle and balance staff may be adjusted so as to swing in a vertical plane at right angles to the magnetic meridian, as it does in the instrument when counterpoised or neutralized against the vertical force of terrestrial magnetism. I next embed the needle in iron filings—i. e., I load the needle with all the iron filings its force of attraction is capable of holding and then remove and carefully weigh the load. This I repeat several times, weighing each load, and then obtain the average weight of the several loads. This will give the average force of attraction of the needle. Now, supposing that five loads will give an aggregate of one hundred milligrams, or an average of twenty milligrams, this will give an average attractive power of ten milligrams for each pole. I again load the needle as before, and remove the load from the south pole only, and set the needle-staff on the support above referred to, and suspend ten milligrams from said south pole, so as to balance the load on the north pole. This point will therefore be the center of attraction or the point of leverage of the needle. In the example in point the leverage of the balance is said to be one-seventh of an inch from its fulcrum and that the needle D is two inches long—that is to say, each limb of the needle is seven times the length of the distance from the point of leverage to the axis of rotation of the balance M, and by the above method it will be found that the center of attraction or point of leverage of the needle is six-sevenths of an inch from its axis of rotation. It will therefore be necessary to divide by six the number of points or milligrams indicated by the register in order to obtain the correct weight of a magnetic, electric, or electro-magnetic force exerted on said needle—in other words, the force exerted on the needle is to the weight on the balance as the leverage of the balance is to the magnetic leverage or center of attraction of the needle.

In constructing instruments of the class described that will give the same results it is also necessary that the same weight should in each neutralize or counterpoise the needle against the whole force of terrestrial magnetism—namely, the force from the angle of dip—that force being taken as a standard force. This I effect as follows: If, for example, it is desired to adjust or magnetize a needle so that fifteen hundred milligrams on the balance will counterpoise or neutralize it as to terrestrial magnetism and find upon trial that it requires only fourteen hundred and eighty milligrams, I subject the needle to the influence of a magnet in the usual manner to increase its magnetic power. If on trial it is found that said power is too great, I lock the needle against rotation with one pole up and partially demagnetize the same by passing the like pole of the inducing-magnet by an undulatory or waving motion of about one-half second's duration and at the distance of about one inch like a flash over the point of the needle, and in this manner I can adjust the needle to a point or unit of weight and can thus bring the magnetic power of the needle to any desired standard. In this manner I am also enabled to maintain the magnetic power of the needle up to standard, since such a needle may at any time be completely demagnetized and again magnetized to the desired standard of power to maintain the instrument at a standard of efficiency. At the magnetic equator the vertical force of terrestrial magnetism ceases, while said force varies in intensity from said equator to the poles, as is well known, while the force from the angle of inclination or dip is constant, or nearly so, in all latitudes and is here taken as a standard force, since it is the full force or intensity of terrestrial magnetism.

The mode of using the instrument is as follows: When used for weighing the intensity or force of terrestrial magnetism the instrument is set in the magnetic meridian by the needle. It is then set up in a vertical position to allow the needle to swing in the plane of the magnetic meridian, or north and south. The needle will at once indicate the angle of inclination or dip, which is noted. The balance M is then brought in position and the balance-staff lowered to lock said balance against rotation on the line east and west, as above described. The north pole of the needle, by means hereinbefore described, is now elevated ninety degrees from the noted angle of inclination and the weights on the balance previously set to zero manipulated to counterbalance the attractive force and hold the needle D, when set free, in the position in which it was brought. The register will indicate the number of points or twenty-fifths milligrams on the scale, the two poles of the needle being then at right angles to the current of terrestrial magnetism. It is obvious that if the weights were moved one point or unit plus, the balance would incline toward zero, while if moved one point or unit minus, would cause the needle to incline toward dip. Thus the entire force or intensity of terrestrial magnetism exerted on the needle is counterpoised by gravity, said needle being absolutely neutral to and independent of this magnetic force, and this is the first neutral position of the needle. To neutralize the needle against the vertical force of terrestrial magnetism, which is the second neutral position of the needle, the table A' is set in the magnetic meridian, as before. The instrument is then placed vertically on the table on the line east and west, allowing the needle to swing in a plane at right angles to the magnetic meridian, the weights having previously been brought to zero by reversing the rotation of arbor O, which also brings the hands of the register-dials to zero, and the balance or scale adjusted parallel with said needle with the weights toward the south pole thereof. In this position the needle will, when set free, point to zero, or lie in a perpendicular plane with its north pole down. The balance is now locked against rotation, and at the same time brought into position for weighing, the weights being shifted, as described, until the needle, when set free, will lie horizontally or in the plane east and west of the instrument. In this operation, as in the former, the two poles of the needle are brought at right angles to the line of terrestrial magnetism by a gravital force.

In order to prove the perfect counterpoising of the needle, I proceed as follows: The instrument, with its needle counterpoised against the vertical forces of terrestrial magnetism, is now placed on a line north and south on its support, allowing the needle to swing in the plane of the magnetic meridian. The needle will now assume a horizontal position under the influence of the horizontal force of terrestrial magnetism, the needle having been neutralized as against the vertical force only—that is to say, the total force of terrestrial magnetism can only be exerted on the needle when placed to swing in the magnetic meridian, this force decreasing with the deviation of the needle from this position. In this instrument the total force of terrestrial magnetism is fifteen hundred points, and as one point equals one-twenty-fifth of a revolution of one of the weights, or one-twenty-fifth of a milligram, fifteen hundred points will equal $1,500 \div 25 = 60$ milligrams; but, inasmuch as the point of leverage of the balance is distant one-seventh of an inch from its fulcrum, we have $60 \div 6 = 10$ milligrams weight of the total force of terrestrial magnetism. Now, if the position of the instrument is changed so that the needle will lie due east and west, the total force of terrestrial magnetism is not exerted thereon, and by operation it is found that this force equals fourteen hundred points, and this I call the "vertical force of terrestrial magnetism." That the needle has been neutralized as against this force may be readily demonstrated, first, by neutralizing the needle as against the horizontal force that holds the same in the horizontal position, and it will be found that it requires exactly one hundred points or four revolutions of one of the weights to do this; secondly, by again placing the instrument on the line east and west of its support and by causing the needle to revolve under the influence of some artificial force. The moment the force ceases to influence the needle its speed will gradually decrease its motion like that of any other revolving body, ceasing as soon as the force of gravitation overcomes its momentum after the power applied has ceased to influence it, so that the needle may come to a standstill at any point of the graduated circle. It is obvious that the needle is now absolutely neutralized as to terrestrial magnetism, since it can be moved by an attractive force to any point of the graduated circle, where it will remain after the force applied is withdrawn. The needle is therefore perfectly free to be influenced by a local magnetic or electro-magnetic force. The same demonstration may be made with the needle on the line north and south after the force of attraction or intensity of the magnetic current from the angle of inclination or dip has been counterpoised.

To weigh an electric force and to weigh the resistance to such force by a conductor, the instrument, as shown in Fig. 4, is set on the line east and west, and the needle D is then neutralized as to the vertical force of terrestrial magnetism, as above described.

A spool of wood, upon which is wound an insulated wire, is attached to the instrument in the following manner: The spool of wire $M^2$ is mounted in a rectangular frame, $M^3$, of brass, except one side, $m^3$, thereof, which is of insulating material or is insulated from the other parts of the frame, and carries the binding-screws $m^6$ for connecting the ends of the spool-wire with the plus and minus poles of a battery. The frame is rotatably connected with the back plate, E, of the instrument by means of a connecting-plate, $M^4$, Fig. 18, that has a hole, $m^4$, into which fits the center or axial pin, $e$, on the said back plate, E, said pin being provided with a groove, into which fits the longitudinal portion of a button-hole formed in a latch, $M^5$, pivoted to the connecting-plate $M^4$. The latter plate is further provided near its opposite ends with a screw-threaded hole for the reception of the threaded ends of the supporting-rods $m^5$, that pass through sleeve-bearings $m^7$, formed on or secured to frame $M^3$, so that said frame can be revolved on the axial pin $e$ of back plate, E, of the instrument. A current of electricity passed through the coil will attract the needle D, and said needle will place itself parallel with the coil $M^2$. The coil is now turned so that the needle will lie in its natural position, north and south, with the north pole down. The balance is now brought into position for manipulating the weight N or both weights N and N'. Enough weight is then added to the counterpoise of the vertical force of terrestrial magnetism until the electrical attractive force of the coil on the needle D is also counterbalanced and said needle neutralized as to said force, when it will, when set free, remain in a horizontal position.

It is obvious that the two forces—namely, terrestrial magnetism and local electricity— are counterpoised, and the difference between the counterpoising force of terrestrial magnetism and the counterpoising force of both the terrestrial and local electrical forces divided by six, as hereinbefore stated, will indicate the force exerted by the latter on the needle. In other words, the remainder obtained by deducting the weight of terrestrial magnetism from the weights of both terrestrial magnetism and local electrical force divided by six will give the weight of the latter force. That this is correct is demonstrated by the fact that one point plus or minus in the manipulation of the weight or weights will cause the needle to incline from a line due east and west toward the south or north pole, respectively, as is the case in ordinary scales, in which either the scale-pan or the weighing-pan will drop according as the weight in either preponderates.

To find the resistance in a wire of given length and dimensions the poles of the electrical source are first connected directly with the terminals of the spool $M^2$ and the electrical force weighed. The plus pole of the electrical source is then disconnected from the like terminal of the spool $M^2$, and the wire the resistance of which it is desired to ascertain is interposed between the said plus poles, or, in other words, placed in circuit and the force again weighed, thus giving an exact data from which the resistance of the wire can be calculated.

I have hereinbefore described two modes of neutralizing a polarized body or rendering the same indifferent to magnetic influences, and it remains now to describe a third, which has long been known to science, but, so far as I am aware, has never been applied to practical purposes—as, for instance, for the purpose of locating mineral magnetic deposits, or what is commonly termed as "prospecting."

A magnetic needle or similar polarized body is neutral or indifferent to the influence of terrestrial magnetism when it swings in a plane perpendicular to the angle of inclination with its staff in line with or parallel with the magnetic current. The magnetic current influences, in this position of the needle, both of its poles alike, and neutrality of the needle naturally follows. This result is obtained in the following manner, referring to Fig. 3: The instrument is pivoted to the arms $A^2$ of the plate A', as hereinbefore described. A quadrant, Y, is secured to bracket-arm $A^3$ by means of the screw $a^3$, said quadrant lying in the plane north and south of the plate and instrument. A sliding support and index, Y', provided with an arm, $y'$, supports the north end of the instrument, said support Y' being adapted to slide in a slot, $y$, of the quadrant, and is fixed in any desired position by a screw, $y^3$. Supposing the angle of inclination of any particular locality to be seventy degrees or twenty degrees, the instrument is inclined, say, to an angle of twenty degrees from the perpendicular on the scale of the quadrant. The needle-staff will now lie parallel with the line of terrestrial magnetism, while the needle D will swing in a plane perpendicular thereto, the weights on the balance M being at the zero position. The practical use of this third neutral position will be described hereinafter.

In the use of the instrument for prospecting purposes the following has to be determined before entering the field of mineral magnetic deposits, to wit: the difference between the magnetic and geographic meridian, the angle of inclination or dip due to the particular latitude, and the intensity of force of terrestrial magnetism on the needle on both lines north and south and east and west. Provided with the means of ascertaining the time when the sun passes the meridian, the operations will be conducted on a neutral field—that is to say, on a field where no local magnetic forces are supposed to influence the needle of the instrument. The plate or tripod table A' being duly leveled, the meridian-staff X, Fig. 15, provided with a foot-disk, $x$, from which projects an axial pin or journal, is set centrally of the table, with the pin or journal in the hole or socket 1 of said table. The table A' is adjusted so that the shadow of the staff will be thrown into the space between the lines 6, referred to hereinbefore, the moment the sun passes the meridian, the table A' being now in the geographical meridian of the locality. When the instrument is placed on the table A', its needle D will assume a position in the magnetic meridian and indicate the degree of declination, or, technically speaking, the variation of the needle due to that locality, and this variation is noted. Since this and the following operation has to be repeated on the field to be prospected, it will be necessary to here describe the mode of setting the table A' out of the geographic into the magnetic meridian without the use of a compass. This may be done by means of a diopter, X', Fig. 17, provided with a vernier, $x'$, sighting-slit $x^2$ at one end, and a hair-line, $x^3$, at the other. The diopter is revoluble on the table A' on a journal or pin fitting in the central hole, 1, of said table and is set with the zero-indications of its vernier coinciding with the like indications south on the graduated circle of said table. At a convenient distance—say fifty feet—a stake is set up and sighted so that the hair-line will coincide therewith and will form with the vertical axis of the instrument (as indicated by a plummet suspended axially from the tripod) the geographic meridian. Supposing that the declination as previously ascertained is three degrees west by north, the diopter is revolved so as to indicate by its vernier three degrees west by south. The table A' is now revolved on the tripod until the hair-line again coincides with the stake. In this manner the table A' is shifted out of the geographic into the magnetic meridian, the needle of the instrument when placed on the table pointing due north and south. This primitive method when carried out with a little care is sufficiently correct for the purposes in view when better means to determine the true geographic and magnetic meridians are not available. Having placed the instrument in the magnetic meridian of the neutral field, the angle of dip or inclination is next ascertained as well as the intensity of the magnetic force of the locality on both lines, north and south and east and west as hereinbefore described. The results are noted for further use.

I have now to ascertain whether or not the field is really a neutral field, since were local magnetic influences present the indications obtained—declination, inclination, and counterpoise—would be erroneous. This is ascertained by placing the instrument into the position, hereinbefore described, to bring the needle $d$ into its third neutral condition. If the needle shows perfect neutrality, it is proof that no local magnetic influence is present. If otherwise, then the prior observations are erroneous, since local magnetic forces have influenced the needle in all these observations. It is therefore necessary that the observations referred to should be made on a neutral field.

With the data obtained by the operations just described I can proceed to the field of actual operation or prospecting. In practice, when it is not known whether the field in which the prospecting operations are conducted contains magnetic deposits, the operations are conducted at first with the instrument in the third neutral condition, as if the field were a neutral one, until the influence of local magnetism asserts itself. It then becomes necessary to establish first a geographic north and south line and the magnetic meridian by means of the instruments as described above. The magnetic-meridian line is then staked out over the whole field, as also the corresponding right-angular or east and west line, in equal spaces of, say, one hundred feet as bases of operation. Again, we operate first with the needle in its third neutral state, since it will show the local magnetic influence, as the north pole of the needle will point toward it. As is well known, all magnetic deposits are in themselves large magnets and are naturally polarized and necessarily in the angle in which the current of terrestrial magnetism has passed through such deposit for ages—that is to say, in the angle of inclination or dip with the south pole up and the north pole down. This being the case, such deposits have a magnetic meridian or line of greatest attraction varying with the extent of the deposit, but always corresponding with the magnetic meridian of the latitude. The instrument is now placed in the magnetic meridian of the deposit, which is done by shifting the instrument to the east or west of the north and south base-line, as circumstances may require, to a position where the needle will point due north and south, with the needle in its third neutral state.

The shifting of the instrument from one position to another and the placing of it in each new position in the magnetic meridian are effected as follows: I start from any point of the north and south base-line, which point is staked out, the instrument being adjusted over the stake so that the plummet suspended therefrom will coincide or be perpendicular to the stake. Another stake is driven at the point to which the instrument is to be shifted—say east of the base-line. I next ascertain the angle of the two positions by means of the diopter and table A' and note the same. The instrument is then shifted to the new position, the instrument being duly centered by the plummet, and the diopter, in a reversed position, is set on the table A', as before, in the same angle, so as to sight back to the stake at the position first occupied by the instrument, the table being revolved to sight the stake of said first position. In this manner I can shift the instrument to any desired position on the field and always set it into the magnetic meridian of the latitude; but in the final observations I refer to and make corrections from the original established base-line. Having thus placed the instrument into the magnetic meridian of the deposit, the instrument is shifted to the south of the same, in order to withdraw the south pole of the needle from the influence of the north pole of the deposit, which is ascertained when the north pole of the needle points due north.

The line of the magnetic meridian of the deposit may now be verified and located. This is done by neutralizing the needle as to the vertical terrestrial magnetic force by the previously-ascertained counterpoise. If the magnetic meridian of the deposit has been correctly established, the needle will point to zero with its north pole down; if not, then the instrument must be shifted east or west, as may be required, until the needle stands in that position. The meridian line so obtained is staked out northward, the stakes being set at a shorter distance apart than that above referred to. The needle is then neutralized against or made indifferent to the entire force or intensity of terrestrial magnetism by the necessary weight, as previously ascertained, and the instrument placed vertically on the line north and south of the table A'. The needle will now point toward the point of greatest magnetic attraction of the deposit. If the needle remains at an inclination approaching within five degrees or eight degrees, which is that of the normal dip, the position is staked out and the angle of inclination noted. The instrument is then shifted so far north on the meridian that the needle will stand in the normal angle of inclination or dip, or very nearly so. This position is also staked out and the distance between the two noted.

The two angular lines obtained by the needle with reference to the surface and the distance of the two positions are transferred by means of a protractor to a sheet of cross-section paper, the point of intersection of the two lines being the point of greatest attraction of the deposit. By drawing a vertical line from the point of intersection of the two angular lines to the surface-line the latter point of intersection will be the point of greatest attraction vertically over the deposit, while the depth below the surface can now be read from the cross-sections. The instrument is now placed over the point vertically over the deposit on a line east and west, and the needle is again counterpoised by the known normal weight against the vertical force of terrestrial magnetism, and the correctness of the meridian of the deposit, the bulk of which deposit may lie a little to the east or west from the first position, is verified. If the bulk of the deposit lies either east or west of said first position, the instrument is shifted accordingly until the needle again lies in a vertical plane. From this corrected vertical point angles may again be obtained from the east and west of five degrees to eight degrees from the vertical to correct the measurement of depth, which will coincide, or nearly so, with that first obtained. On this point vertically over the deposit its magnetic force may be weighed by shifting the weights to neutralize the needle against such force. The weight, as indicated by the register, in excess of the weight of the vertical force of terrestrial magnetism will indicate the weight of the force of the magnetism of the deposit. I recommend sharp angles of about five degrees for measurement, in order to keep the south pole of the needle always as much as possible out of the range of influence of the north pole of the deposit.

By the described method of correcting the meridian of the deposit from position to position, and likewise the point vertically above the deposit, and weighing the magnetic force exerted on the needle in all positions, and comparing said forces with the depth, an approximately correct idea can be formed of the topography and magnitude of the deposit. The more observations and comparisons made the more complete will be the information gained, and in this manner the best location for shafts may be ascertained as well as other valuable information for the practical working of the mine obtained.

In order to enable the operator to work on straight lines, I provide means for measuring angles. These consist of a plate, Z, on which is drawn an arc of ninety degrees. From the foot of said plate projects a pivot-pin that fits into the center hole, 1, of the plate A', and said plate has a bearing forming the center from which the arc is drawn, into which fits the pin or journal $x^4$ on the diopter X'. The diopter can therefore be revolved on the plate Z, the vernier $x'$ traveling along the arc. The use of these devices is too well known to need further description, and forms only a necessary and convenient though not indispensable accessory to the instrument, since this operation, as well as the determining of the geographical meridian, may be effected by other well-known instruments. I would finally remark that in all the operations with the instrument the vibrator hereinbefore referred to should be used each time the needle is set free to neutralize frictional antagonism to the movements of said needle.

I have herein described an instrument in which the needle and balance are mounted on the same staff, for purposes set forth. This of course is given as one form of practical arrangement involving the principles set forth—namely, that a polarized body can be neutralized or rendered insensible or indifferent to magnetic, electric, or electro-magnetic forces, in order to weigh the same, or for the purpose of weighing other like forces.

For the purpose of weighing electric or electro-magnetic forces only, the revoluble needle and balance may, however, be dispensed with and its motion limited to a few degrees to one side or the other of a horizontal line, as in ordinary scales, the balance being, as is the case in such instruments, mounted on knife-edges.

I have deemed it unnecessary to illustrate this modification of the instrument, as this forms the subject-matter of a separate application for patent filed September 28, 1888, Serial No. 287,033.

Having described my invention, what I claim is—

1. An instrument for determining the value of magnetic or electric or electro-magnetic forces, comprising a polarized body, a balance, a fulcrum common to both, an adjustable weight on said balance, a register, shifting mechanism for shifting the weight on the balance, and transmitting mechanism for transmitting the movements of the weight to the register, as described, for the purpose specified.

2. An instrument for determining the value of magnetic or electric or electro-magnetic forces, comprising a polarized body, a balance, and a revoluble staff upon which said body and balance are poised, said body being adapted to be rotated independently of the staff and balance, to adjust the same in any position relatively to the balance, substantially as and for the purpose specified.

3. An instrument for determining the value of magnetic or electric or electro-magnetic forces, comprising a polarized body, a balance, a revoluble staff or arbor upon which said body and balance are poised, said body being adapted to be rotated independently of the staff and balance, and a stop to lock the balance and staff against rotation, substantially as and for the purpose specified.

4. An instrument for determining the value of magnetic or electric or electro-magnetic forces, comprising a polarized body, a balance, a revoluble staff or arbor upon which said body and balance are poised, said body being adapted to be rotated independently of the staff and balance, a shifting device for shifting the staff from its bearings, and a stop for locking the balance and staff against rotation when so shifted from its bearings, substantially as and for the purpose specified.

5. An instrument for determining the value of magnetic or electric or electro-magnetic forces, comprising a dial divided into four sections of ninety degrees each, a magnetic needle, a balance, a staff or arbor upon which said balance and needle are poised and which is revoluble in the center of the dial, and a weight or weights adjustable on the balance, substantially as and for the purpose specified.

6. An instrument for determining the value of magnetic or electric or electro-magnetic forces, comprising a dial divided into four parts of ninety degrees each, a magnetic needle, a balance, a staff or arbor upon which said balance and needle are poised and which is revoluble in the center of the dial, and a weight or weights adjustable on the balance, in combination with a supporting-plate and means, substantially such as described, for supporting the instrument either in a horizontal or vertical north and south and east and west plane, or in a plane at an angle to the north and south line, substantially as and for the purpose specified.

7. The combination, with the staff K, of the bearings $g$ and $h$, consisting each of a jewel having a bearing enlarged from a center toward the outside to form a knife-edge bearing, $g^2$, substantially as and for the purpose specified.

8. The combination of the staff K, having collars or flanges $k^4$ $k^5$, the cock G, constituting one of the bearings of said staff, the bridge $E^2$, through which the other end of the staff projects and upon which the collar $k^5$ is adapted to bear, and the spring-actuated angle-lever H, constituting the other bearing for said staff, the bearing end of which projects under said bridge of shifting devices for shifting the staff from its bearings, consisting of the spring-actuated angle-lever I, operating on flange $k^4$ of staff K, and the push-bar L, provided with inclined faces $L'$ $L^2$, for tilting the levers I H, substantially as and for the purpose specified.

9. The combination, with the revoluble shaft K, the needle D, and balance M, carrying toothed weights N and N', of the pinion $o$, for rotating said weights on the balance, and a shifting device for shifting said pinion into and out of gear with one of the weights, whereby either one or both weights may be rotated on the balance, substantially as and for the purpose specified.

10. The combination, with the staff K, the balance M, rigidly secured thereto, and the needle D, revoluble on said staff, of the crown-wheel C, provided with pins projecting from its upper face, shifting devices for shifting the staff K vertically to bring the needle into the path of said pins, and a stop to lock the staff and balance against rotation, whereby said needle may be rotated on the staff through the medium of the pins on the crown-wheel independently of the staff and balance, substantially as and for the purpose specified.

11. The combination, with the staff K, the balance M, rigidly secured thereto and carrying toothed disk-weights N and N', the needle D, revoluble on staff K, a shifting device for shifting the staff vertically, and a locking device for locking said staff against rotation when shifted, of the arbor O, carrying a pinion, $o$, adapted to mesh with one or both weights, and a train of registering-gearing operated from the worm-thread of the arbor, substantially as and for the purpose specified.

12. The combination, in an instrument of the class described, of a revoluble staff, a balance rigidly connected thereto and carrying a weight or weights adjustable thereon, a shifting device for shifting the weights on the balance, and a train of registering-gearing operating hands indicating units, tens, and hundreds, operated from said shifting device and constructed to rotate the hands in the same direction, forward or backward, substantially as and for the purpose specified.

13. The combination, with the herein-described instrument provided at its southeast and southwest corners with journal-bearings, a supporting-plate for said instrument, and journals pivoted to said plate and fitting into said journal-bearings, of a quadrant adapted to be secured on the line north and south of the instrument, a slide-rest for supporting the north end of said instrument, a pointer adapted to travel along the graduations of the quadrant with the slide-rest, and a locking device for locking the slide-rest in position on the quadrant, substantially as and for the purpose specified.

14. The combination, with the described instrument provided on its back plate with an axial pin, of a frame adapted to revolve on the axial pin, a spool of insulated wire supported from said frame, and binding-posts for connecting the wire ends with a source of electricity, substantially as and for the purpose specified.

In testimony whereof I affix my signature in presence of two witnesses.

ADOLPHUS GIPPERICH.

Witnesses:
CHARLES EUKER,
JAMES E. TYLER.